United States Patent [19]

Wurzel et al.

[11] 4,006,659
[45] Feb. 8, 1977

[54] SPRING-METAL RETAINING RINGS

[75] Inventors: Hugo Wurzel, New York; Melvin Millheiser, North Bellmore, both of N.Y.

[73] Assignee: Waldes Kohinoor, Inc., Long Island City, N.Y.

[22] Filed: Oct. 3, 1975

[21] Appl. No.: 619,689

Related U.S. Application Data

[63] Continuation-in-part of Ser. No. 550,113, Feb. 14, 1975, abandoned, and a continuation-in-part of Ser. No. 365,464, May 31, 1973, abandoned.

[52] U.S. Cl. .............................. 85/8.8; 308/DIG. 11
[51] Int. Cl.² ........................................ F16C 33/30
[58] Field of Search ............ 24/20 R, 20 CW, 256; 308/DIG. 11, 189, 236; 85/8.8

[56] References Cited

UNITED STATES PATENTS

| 221,655 | 11/1879 | House et al. ................. 24/256 UX |
| 2,798,748 | 7/1957 | Maurer ........................... 85/8.8 X |
| 2,982,165 | 5/1961 | Wurzel ........................... 85/8.8 |
| 3,232,088 | 1/1966 | Newcomer et al. ............. 85/8.8 X |
| R18,144 | 8/1931 | Heiermann ................ 308/DIG. 11 |

FOREIGN PATENTS OR APPLICATIONS

| 532,373 | 10/1956 | Canada .................................. 85/8.8 |
| 51,058 | 9/1941 | Netherlands ......................... 85/8.8 |
| 115,245 | 10/1945 | Sweden ............................. 308/236 |

Primary Examiner—Donald A. Griffin
Attorney, Agent, or Firm—J. Harold Kilcoyne

[57] ABSTRACT

Multiarc (multi-truss) retaining ring adapted for assembly in a circumferential groove provided for its reception on or in a carrier-member surface, such as that of a shaft, spindle and the like or a housing bore, thereupon to form an artificial machine-element (part) retaining and/or locating shoulder on or in said carrier member, the outer and inner edges of the ring body, rather than being continuous, each comprising the arcuate edges of a plurality of short-length circumferentially spaced-apart arcuate "beams," the inner-edge arcuate "beams" being staggered, i.e. non-radially related, with respect to the outer-edge arcuate "beams" and said outer- and inner-edge "beams" being each trussed by ring-body portions (arms) extending non-radially (divergently) therebetween, the aforesaid arrangement of outer-edge and inner-edge "beams" and ring-body connecting portions of arms or such that the ring body has configuration in plan corresponding to a plurality of serially-connected upright and inverted queen trusses having common connecting arms extending between the outer-edge and inner-edge arcuate "beams" thereof, and the length and inclination of the said connecting arms being such that circumferential stresses acting around the ring body as an incident to its being expanded or compressed (contracted) will cause an elastic circumferential lengthening or compression of the ring body to a significant degree.

23 Claims, 16 Drawing Figures

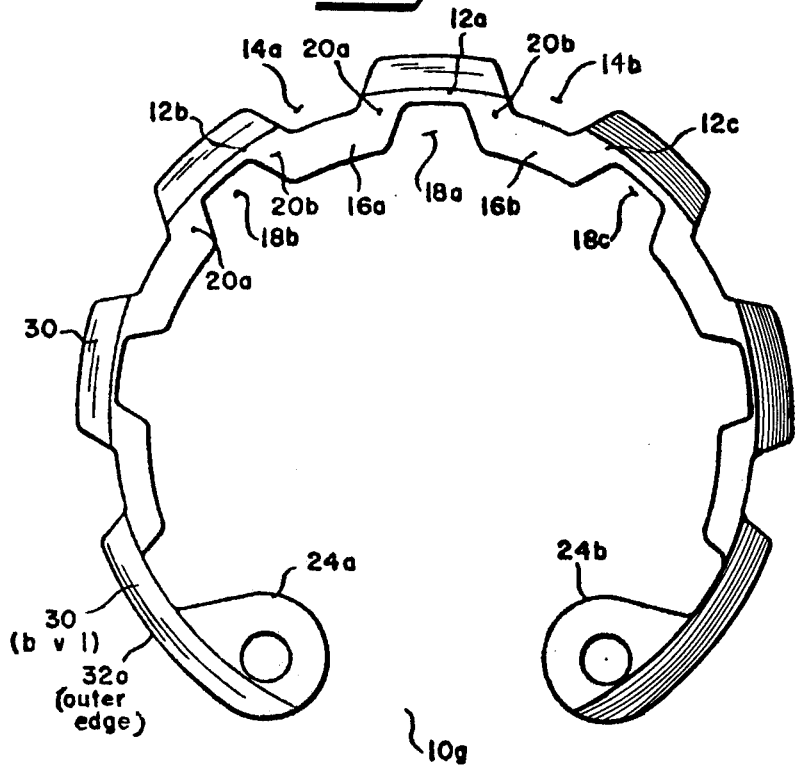
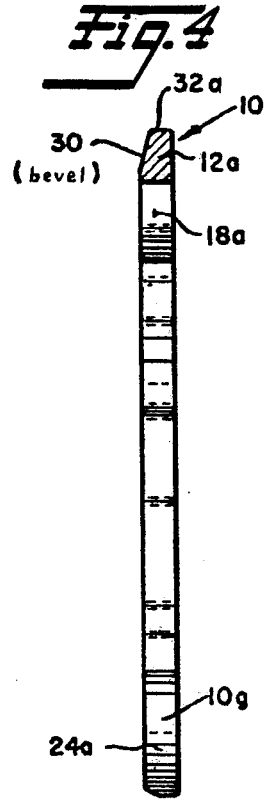
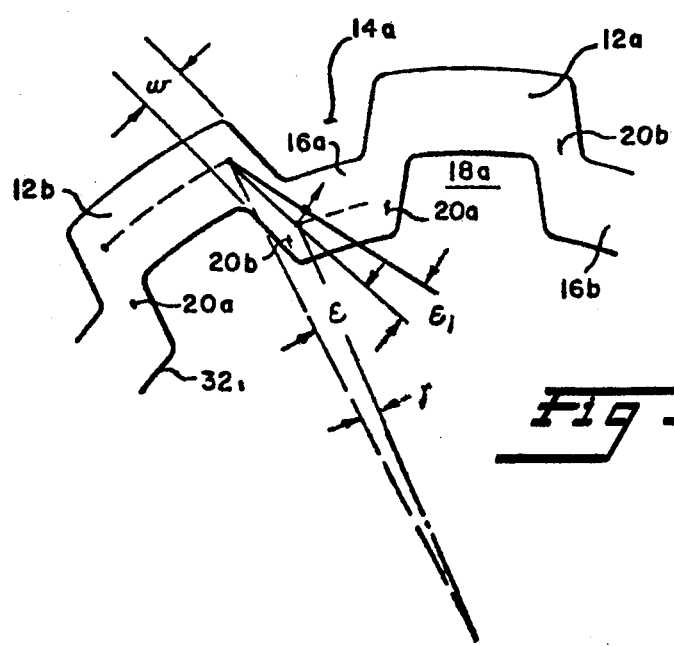

SPRING-METAL RETAINING RINGS

HISTORY

The present application is a continuation-in-part of application Ser. No. 365,464, filed May 31, 1973 (abandoned), and of Ser. No. 550,113, filed Feb. 14, 1975, (also abandoned).

INTRODUCTION

This invention relates generally to improvements in spring-metal retaining rings adapted, when assembled in a circumferential groove machined or otherwise provided therefor in the surface of a carrier member such as a shaft, spindle, etc. (external form) or in the surface of a housing bore (internal form), to provide an artificial machine-element or part locating and/or retaining shoulder projecting from the shaft periphery or from the housing-bore surface. More particularly, the invention is directed to an improved so-called Multiarc or multi-truss retaining ring capable of functioning as aforesaid and which is characterized by a ring body so designed as to deflect to a greater degree than conventional retaining rings, without exceeding the maximum allowable stress for the ring material, and in such manner as to increase or decrease the ring circumference to a significant degree, while at the same time providing a substantial increase in the effective section height of the ring body and of the shoulder formed thereby when the ring is assembled in a circumferential shaft or housing-bore groove of normal depth. Also, properly designed rings of the invention are effective, i.e. provide, substantial shoulder heights when assembled in grooves which are deeper than normal and in which conventional rings are wholly ineffective.

OBJECTS OF THE INVENTION

Stated briefly, major objects of the present invention are: the provision of an improved design of a truss retaining ring (both external and internal forms) which overcomes in large measure the disadvantages of rings constructed according to the conventional tapered section-height designs and which in addition enables retaining rings constructed according to the improved design of the invention to deflect to a greater degree whereby they are less likely to take on a permanent set than conventional tapered section-height retaining rings; the provision of an improved design of retaining rings which mades possible, by virtue of their capability of deflecting to a greater degree as aforesaid and in manner as to increase or decrease their circumference to a significant degree, the accommodation of a range of shaft and housing-bore diameters with fewer sizes of retainng rings; the provision of a practical and effective Multiarc i.e. multi-truss (so-called) retaining ring, i.e. a retaining ring whose ring body, rather than being continuously arcuate or substantially so from end-to-end, instead comprises a plurality of serially connected upright queen and inverted queen trusses having common connecting arms which extend divergently from and connect the arcuate "beams" of said trusses in series with one another, thereby supplying greater effective shoulder height than is possible with conventional tapered retaining rings; and the provision of a Multiarc (multi-truss) retaining ring as aforesaid wherein the ring is rendered non-planar by virtue of its arcuate "beams" being beveled along their groove-seating edges, in manner as to take up end-play upon the ring being assembled in its groove.

BACKGROUND OF THE INVENTION

To appreciate the advantages of a multi-truss retaining ring having the capability of deflecting to a greater degree than conventional tapered section-height retaining rings without taking on an excessive permanent set and in such manner as to increase (external form) or decrease (internal form) the circumferential length of the ring body, it may be helpful to sketch briefly the development of the retaining ring art leading to the present invention, as follows:

The oldest retaining rings still in use to retain machine parts on shafts, etc., or in housing bores are rings of uniform radial-section height made of coils of wire. Under stress, such uniform section-height wire rings do not deform uniformly circularly but instead they deform elliptically, and hence under stress they do not seat uniformly against the bottoms of the grooves in which they are conventionally assembled. Also, these uniform section-height rings made of coils of wire are severely limited as to their section heights (which are relatively small) and to use in grooves of shallow depth.

The first documented effort directed to overcoming the aforesaid disadvantages of uniform section-height rings is represented by Heiermann U.S. Pat. No. 1,758,515 (reissued as U.S. Pat. No. Re. 18,144) disclosing and claiming a tapered retaining ring, i.e. a ring having section heights which diminish progressively from a relatively high middle section towards its open ends. While the tapered-section ring of Heiermann, by its capability of deforming substantially circularly under stress, widened the fields of safe application of retaining rings to a considerable degree by providing a ring body having greater section-height than possible with uniform section-height rings and thereby a more effective parts-retaining shoulder without becoming loose in its groove in consequence of a permanent set, provided of course that during assembly and disassembly the elastic limit of the ring body material was not exceeded, it was soon learned that even the tapered retaining rings as per Heiermann U.S. Pat. No. Re. 18,144 could be assembled in relatively shallow grooves only, resulting in proportionately limited thrust load capacities of the ring-in-groove assemblies employing same.

The above-mentioned limitations of the Heiermann ring resulted in the art developing further to the extent as evidenced by the Wurzel patents disclosing and claiming so-called "pre-stressed" retaining rings, i.e. U.S. Pat. No. 2,861,824 for the internal form rings, and U.S. Pat. No. 2,982,165 for the external form rings. These "pre-stressed" retaining rings were characterized by increased section heights and by diameters requiring a moderately increased (as compared to the Heiermann rings) expansion or contraction in the course of their first assembly, consequent to which they took on a predetermined slight permanent set. Such ring design made possible the installation of the pre-stressed ring in deeper shaft or housing bore grooves, in turn resulting in substantial increases of thrust load capacity of the ring-in-groove assemblies as compared to the ring-in-groove assemblies employing Heiermann rings.

As far as was then known, the aforesaid deeper groove was the maximum depth of groove in which any and all retaining rings could be assembled. That is to say, while the want therefor may have been present, a prestressed ring designed to be installed in a groove of greater depth than said maximum was considered to be impractical if not impossible of attainment because the bending characteristics of the pre-stressed rings were too limited. Nor could the want for a ring designed to provide the substantially higher shoulder be satisfied, because conventional designs of pre-stressed rings would be too stiff to handle if their section heights were increased to the degree satisfying the higher-shoulder-want. Further and equally important, the higher shoulders would require such higher ring sections as would invariably result in permanent set and looseness of rings in even the aforesaid "deeper groove" achieved under Wurzel, U.S. Pat. No. 2,861,824.

To the foregoing brief recital of the development of the retaining ring art as documented in the patents aforesaid must be added the knowledge that retaining rings generally, when expanded or compressed (contracted), are subject to circumferential stresses which, occuring in the form of tensile and/or compressive stresses acting on the circumferential ring fibers at any section of the ring, result from the forces applied to expand or compress such rings, which forces result in a bending moment acting on any section of the ring. It is these bending moments which cause a change in the curvature of such retaining rings as results in their expansion of contraction (compression). While the circumferential stresses resulting from the bending moments acting on sections around the ring body will in theory cause an elastic lengthening or shortening of the fibers of the ring material, if occurring such as a practical matter is too small to be measured and hence no consideration or study was given to the utilization thereof, nor was any purposeful structuring of the ring body designed to increase or decrease the circumferential length thereof to a significant degree heretofore initiated by such knowledge.

THE INVENTION

The present invention is directed to a Multiarc i.e. multi-truss ring which is structured for the specific purpose of utilizing the bending moments resulting from the forces applied to expand or contract the ring in manner as to increase or decrease the circumferential length of the ring body to a significant degree, as will now be described, reference being had to the accompanying drawing figures, wherein . . .

FIG. 3 is a view in front elevation of an internal Multiarc (multi-truss) ring of the invention, which may or may not have a bevel along its outer (groove-seating) edge;

FIG. 4 is a section on the vertical center plane of FIG. 3, the view showing the bevel of the ring face along its effective outer (groove-seating) edge;

FIG. 5 is an enlarged detail view illustrating a portion of a ring body of the invention, specifically two outer-edge "beams" trussed by adjacent divergent portions of ring-body arms extending between and connecting said "beams" with an inner-edge "beam";

Figure 6:
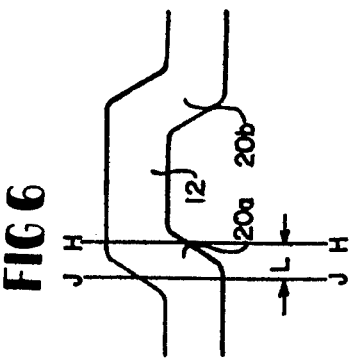
Figure 7:
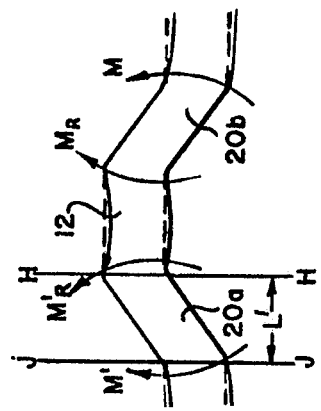
Figure 10A:
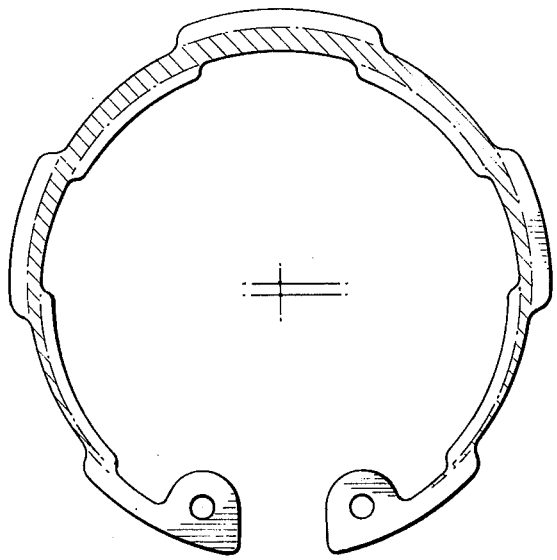
Figure 10B:
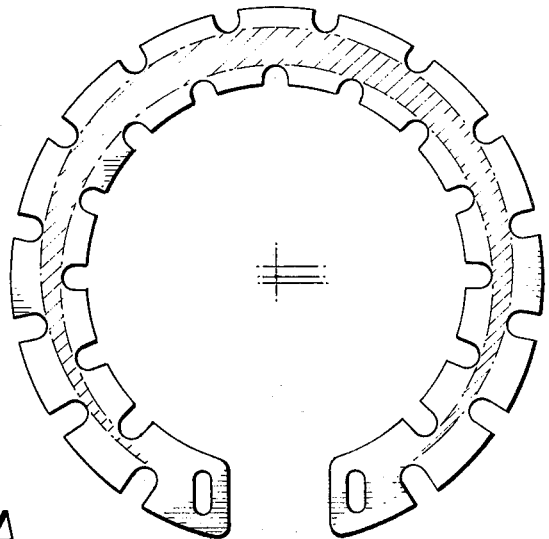
Figure 8:
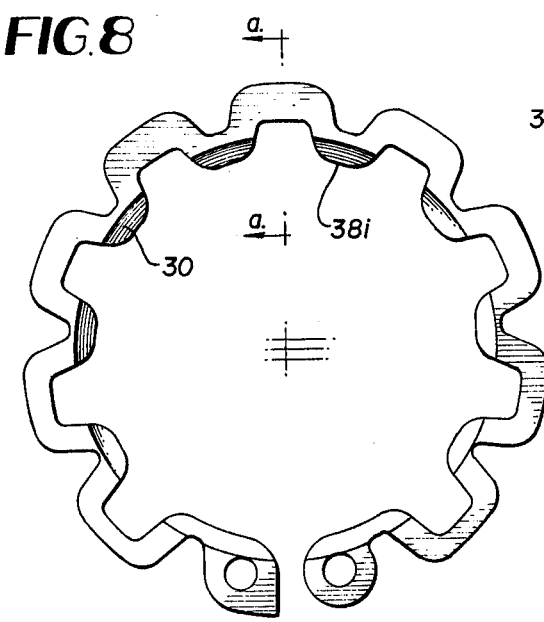
Figure 9A:
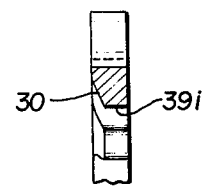
Figure 9B:
Figure 9:
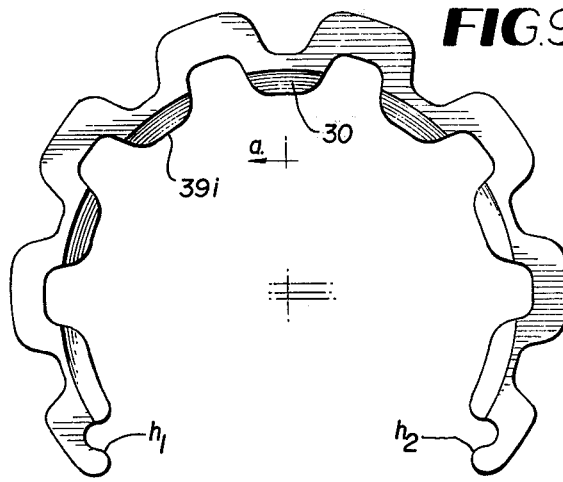
Figure 8A:
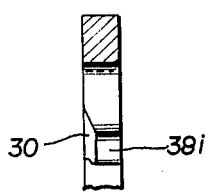
Figure 8B:
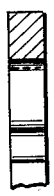
Figure 8C:
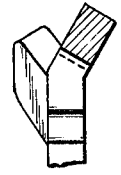

FIGS. 6 and 7 are enlarged fragmentary views of a portion of a ring body of the invention, specifically any one of the plurality of upright queen trusses making up said ring body, in straight layout form which illustrates the behavior of a truss "beam" and its divergent truss arms under force applied to expand the ring of which it forms a part (FIG. 7) as against said truss parts in their normal unstressed state (FIG. 6);

FIG. 8 is a face view of a modified form of a multi-truss ring according to the invention, i.e. a ring which when assembled in a groove provides a uniform height shoulder throughout its length, with FIGS. 8A and 8B being radial sections taken on lines a - a and b - b thereof, and FIG. 8C being a radial section illustrating that the shoulder-forming portions of the upright queen trusses or the beams thereof may be angled out of the plane of the groove seating portions of the ring body:

FIG. 9 is a face view of a so-called wide-gap multi-truss ring having the capability of being assembled either axially or radially, with FIGS. 9A and 9B being radial sections taken on lines $a - a$ and $b - b$ of the ring body, and FIGS. 10A–10B are included to illustrate the continuous "band-of-metal" feature characterizing all prior art irregularly-edged rings known prior to the present application.

Figure 2:
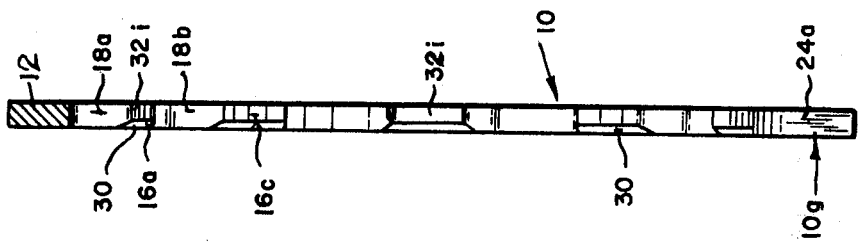
FIG. 2 is a section on the vertical center plane of FIG. 1, the view also illustrating the ring body as having a bevel along its effective inner (groove-seating) edge which enables the ring when assembled in the groove to take up end-play.
Figure 1:
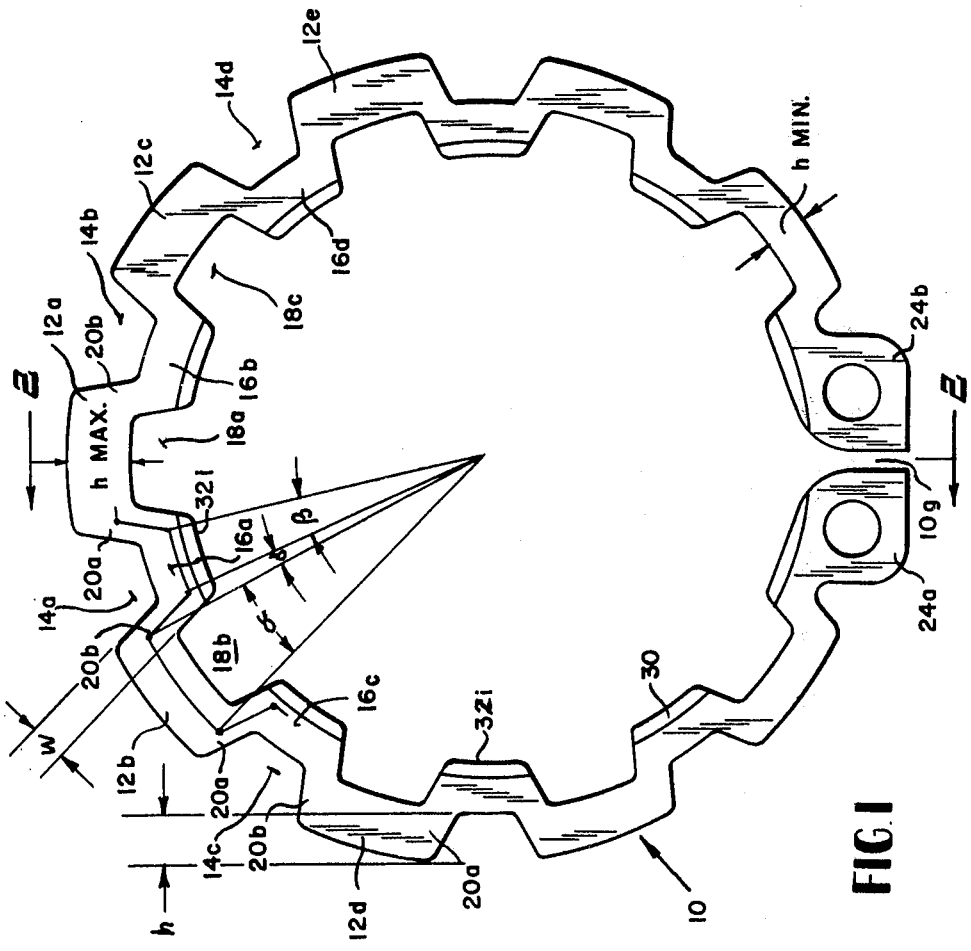
FIG. 1 is a view in front elevation of an external Multiarc (multi-truss) ring according to the invention.

Referring to the aforesaid drawing figures, FIGS. 1 and 2 illustrate a tapered multi-truss ring of the external form according to one ring-form of the invention, and FIG. 2 additionally illustrates that the ring may be of the beveled type capable of taking up end-play when assembled in its groove, i.e. it is provided with a bevel along its effective inner- or groove-seating edge, reference numeral 10 thereof indicates an open-ended ring body comprising a plurality of short-length, circumferentially spaced-apart arcuate outer-edge ring body portions 12a, 12b, 12c, etc. (hereinafter referred to as outer-edge "beams"); a plurality of short-length, circumferentially spaced-apart arcuate inner-edge ring body portions 16a, 16b, 16c, etc. (hereinafter referred to as inner-edge "beams") which are staggered, i.e. non-radially related, with respect to said outer-edge "beams" 12a, 12b, 12c, etc., and ring body portions 20a, 20b, 20a', 20b', etc. in the form of divergent straightway extending arm-pairs interposed between and connecting the ends of each outer-edge "beam" and the circumferentially spaced-apart ends of adjacent inner-edge "beams" and which arm-pairs function as truss arms.

Thus the ring body may be said to comprise and have the configuration of a plurality of serially connected upright and inverted queen trusses having common truss arms of appreciable length as will be more fully discussed.

The ring body 10 (FIG. 1), being of split or open-ended construction characterizing the external-ring form, has as is conventional a narrow-width gap 10g extending between and defining the ring ends, which illustratively are formed as apertured ears 24a, 24b, with or into the apertures of which the points of pliers or other suitable ring-spreading means may be coupled for ring assembly and disassembly (in and from groove) purposes.

It is to be understood that a retaining ring of the invention as illustrated in FIG. 1 is a so-called tapered ring, i.e. a ring whose section heights (radial sections) both actual and effective, decrease progressively from maximum at the ring middle-section to minimum at sections near its ends. That is to say, the section heights of the circumferentially spaced-apart outer-edge "beams" 12a, 12b, 12c, etc. and the section heights of the circumferentially spaced-apart inner edge beams 16a, 16b, 16c, etc., as well, being the actual section heights, decrease progressively from maximum to minimum, just as do the section heights of the conventional tapered ring.

The effective section heights of a ring according to the present invention, i.e. the height of the ring sections as measured from the outer edges of the outer-edge "beams" to the inner edges of the inner-edge "beams", also decrease progressively from maximum at the ring middle section to minimum at sections near the ring ends, but said effective section heights, because of the connecting arms 20a, 20b, 20a', 20b', etc. are at least twice the section heights of the conventional tapered retaining rings. Such is a feature of merit, as it makes possible the fashioning of a tapered ring with substantially increased effective shoulder height and deflectability, as compared to that of conventional tapered rings, without danger of the ring being stressed beyond allowable stress limits or, in the case of prestressed rings, of taking on a permanent set during the course of its being spread over a shaft- or spindle-end during the first assembly operation. As an example, average shoulder heights up to 5 times those of conventional rings are possible, depending on the design of the particular size of the ring as per the invention.

In explanation, if we consider that the typical ring shown in FIG. 1 has a neutral diameter of outer-edge "beam" in the flexible range consisting of nine parts, each of a length determined by the angle $\alpha$, and a neutral diameter of the inner-edge "beam" in the flexible range consisting of eight parts each of the length determined by the angle $\beta$, we can make the assumption that if these parts, with no consideration being accorded the interposed truss arms 20a, 20b, were added together, they would form a ring according to FIG. 1 (but wherein the inside diameter of the outer arcuate "beams" is equal to the outside diameter of the inner arcuate "beams"), which would allow a deflection according to the known stress formula, as follows:

$$\delta = \frac{(d_1 + 2h)(d_2 + 2h)s}{h_{max}.\ E}, \text{ wherein}$$

$\delta$ = deflection = shaft diameter minus free diameter $d_1$ $d_1$ = free diameter of the ring before it has been expanded $d_2$ = free diameter of the ring after it has been expanded and allowed to spring back to its free state $(d_1 + 2h)$ = the neutral diameter of the ring before it has been expanded $(d_2 + 2h)$ = the neutral diameter of the ring after it has been expanded and allowed to spring back to its free state $h$ = mean section height of the outer-edge "beams"

$h$ max. = maximum section height on vertical center line $s$ = allowable bending stress $E$ = Young's Modulus However, when the ring body comprises a plurality of trusses as illustrated and described in the foregoing and the truss arm-pairs and the substantial length of said truss arms are given due consideration, the deflection capabilities of the ring are increased to a substantial degree. That is to say, again taking the ring shown in FIG. 1 by way of example, wherein there are 18 truss arms, each having a neutral axis formed within the angle $\gamma$ (FIG. 5) and wherein the axis of each truss arm is inclined relative to a radius R by the angle $\epsilon$, opening of the ring as when spread over a shaft or spindle end will result in deflection of each truss arm by an angle $\epsilon_1$ (FIG. 5), this deflection being determined by its width $w$, its substantial length along its neutral axis, the modulous of elasticity and the tensile strength of the ring material and the moments acting on said truss arms which will be different for each of the 18 truss arms because of the different position thereof along the ring circumference. From the foregoing, however, it will be appreciated that in the typical case of a ring such as shown in FIG. 1 which has 18 truss arms, the increase in deflection is the sum of the 18 angles $\epsilon_1$ radians, which is an amount allowing an increase of total deflection of free diameter to 1.5 in the case of the ring in FIG. 1, as against $\delta$ being the permissible deflection of the present tapered ring.

Internal truss rings as illustratively shown in FIGS. 3 and 4 will act in the same manner, albeit inversely of that just described.

By varying the number, width and length of the connecting arms 20a, 20b (FIGS. 1 and 3) and the section heights of the beams of the multi-truss rings of the invention, tapered retaining rings having increased section heights and deflection capability can be made in many variations within the spirit and scope of the present invention. As an example of such possible variations, it is stated that the ring body may comprise (be made of) from 3 to 15 connected trusses, depending on ring size; that the truss arms adjoining the arcuate "beam" opposite or nearly opposite the ring gap each has length (which may be defined as the length along its neutral axis of said truss arm between points of intersection of said axis with the outer edge of the outer-edge "beam" and the inner edge of the inner-edge "beam" connected by said truss arm) at least equal to twice the section heights of the arcuate "beam" of the truss disposed opposite or nearly opposite the gap between the open ends of the ring (which "beam" section height may vary from ring-material thickness to 3½ times ring-material thickness); and the angle of inclination of said truss arm with respect to a radius struck from the ring center and which extends through the mid-length point of the outer arcuate "beam" with which said arm connects may vary from 7° to 20°.

It is observed that while the number of connected trusses making up the ring body may vary widely, i.e. from 3 to 15 as above, the arcuate length of any one of the truss beams thereof, either outer-or inner-edge "beams" is readily determined according to the equation $L_o = R_o$ times $\alpha$ wherein $L_o$ = the length of said any one arcuate "beam" under investigation $R_o$ = the neutral radius of said arcuate "beam" measured from ring center $\alpha$ = the included angle in radians between radii from the ring center to the points of intersection of the neutral axis of said arcuate beam and the neutral axis of the truss arm at each end of the aforesaid arcuate "beam".

Retaining rings of the tapered truss design of the invention, in addition to their substantially increased section height and their capability of deflecting to a greater degree (50% or more) than conventional tapered retaining rings, actually incorporate structure endowing rings of the invention with the ability to change, i.e. increase or decrease, their circumferential length to a significant degree under the action of bending moments resulting from the forces applied to the ring ends to spread or contract the ring bodies in their assembly or disassembly, for example More particularly and referring to FIGS. 6 and 7 which illustrate the same one of the plurality of upright trusses (each consisting of arcuate outer-edge "beam" 12 and its truss arms 20a, 20b) of the ring body according to FIG. 1 in straight layout form, FIG. 6 depicts said ring body portion (beam" and its divergent truss arms) in its free or unstresses state, whereas FIG. 7 illustrates the behaviour of said truss parts under the action of bending moments resulting from forces assumed to be applied to the ring-body ends to spread same, for example, in its assembly in and disassembly from a groove.

While the "beam" is shown in FIG. 7 to have taken on a slight upwardly concave curvature as indicated by its solid line configuration as against its original shape indicated by broken lines, the length of said "beam" remains essentially unchanged. Examination of its supporting truss-arm positions, however, reveals that under the action of the bending moments M, $M'_R$ (and $M_R$ and M being the reaction to M and $M'_R$), resulting from the forces applied to spread the ring body, the truss arms 20a, 20b have rotated (the truss arm 20a throughout a clockwise arc and the truss arm 20b throughout a counterclockwise arc) to new angular positions with respect to the neutral axis of the "beam" 12, the reason being that said moments acting through the outer- and inner-edge "beams" connected by said truss arms 20a, 20b have effected a rotation of each said truss arm. The result is an appreciable increase in the distance between lines JJ and HH (FIG. 6) from L to L' (FIG. 7).

Since each of the truss arms of the 9 truss-arm pairs included in the ring body of FIG. 1 will undergo a similar rotation under the action of moments M, $M'_R$ (and their reaction moments) which result from spreading forces applied to the ring body, it will be appreciated that the structure of the tapered ring of the invention is one allowing a substantial increase in the circumferential length of the ring body when such is called for. Thus, in addition to its other advantages, the tapered i.e. tapering shoulder-forming truss ring of the invention possesses the very practical advantage of making possible the accommodation of a whole range of shaft sizes, with substantially fewer sizes of retaining rings.

As distinguished from the multi-truss tapered, i.e. tapering shouder-forming, ring described in detail in the foregoing, the invention also contemplates and provides a multi truss uniform shoulder-forming ring now to be described in connection with FIG. 8. More particularly, according to said FIG. 8 form, the arcuate beams of the upright queen trusses and of the inverted queen trusses have progressively decreasing section heights, as with the prior-described ring forms, whereas the intermediate lengths of the divergent arms which connect said outer and inner beams (being the lengths of that section of the arms between their intersection with the circle comprising the inner edge of the outer-edge beams and the circle comprising the outer edge of the inner-edge beams) have progressively increasing lengths which are such that when the ring body is assembled in its shaft groove, it provides a uniform height shoulder throughout its circumferential length.

While not described in the same detail as given above for the external form of the ring of the invention, it will be understood that the internal form of tapered truss ring of FIGS. 3 and 4 will function in equivalent albeit inverse manner. That is to say, ring contracting forces effect a decrease in the circumferential length of the ring body when such is called for. Further, a ring according to FIG. 8 may also be designed as an internal ring adapted to seat in a housing-bore groove.

Referring to FIG. 9, such illustrates a multi-truss ring having the capability of being assembled either axially in the more or less conventional manner or radially, as the terms "axial assembly" and "radial assembly" are well understood in the art. As seen in said drawing figure, such a ring is characterized by a wide gap between its open ends and by the inner arcuate edges of its outer beams and the outer arcuate edges of its inner beams extending along arcs of concentric circles, and by the outer arcuate edges of the outer beams and the inner arcuate edges of its inner beams extending along arcs of eccentric circles, so that the entire ring body may be said to be tapered.

It will be understood however that a similar multi-truss ring having the capability of being assembled either axially or radially may be so designed as to provide a uniform shoulder-height ring similar to FIG. 8, but characterized by a wide gap between its open ends as in FIG. 9. such an alternate design would be further featured by the inner arcuate edges of its outer beams and the outer arcuate edges of its inner beams extending along arcs of eccentric circles and by the outer arcuate edges of its outer beams the inner arcuate edges of its inner beams extending along arcs of concentric circles, so that the entire ring body is capable of forming a shoulder of uniform height when assembled.

It is further noted that the ends of the wide-gapped ring of FIG. 9 and its alternative design as described in the preceding paragraph are shaped as open, mutually facing hook formations $h_1$ and $h_2$, for the reception of the points of plier-type assembly and disassembly tools as conventionally used in spreading the ring ends the amount enabling the ring body to clear the end of the shaft and to be shifted axially therealong to the plane of the groove in which it ultimately seats. It is further to be noted that said hooks formations do not extend into the ring opening as would conventional lugs if such were formed on the ring ends.

Each of the ring embodiments thus far described may have the form of a planar-faced ring whereas it may also be and preferably is provided along its effective groove seating edge i.e. the edges of the beams which seat in the groove provided therefor, with a bevel which enables the ring when assembled in its said groove, to take up end play in known manner. More particularly and referring to FIGS. 2 and 4, each shows a bevel 30 provided along its effective groove-seating edge which latter is the inner edge 32i of the external ring from and the outer edges 32o of the internal ring form.

The same applies to the ring forms of FIGS. 8 and 9, wherein FIG. 8A illustrates a similar bevel 30 provided along the effective groove-seating inner edge 38i of the ring body of FIG. 8, with a similar bevel 30 being provided along the effective groove seating inner edge 39i of the ring body of FIG. 9 it being explained that the related FIGS. 8B and 9B are illustrative of the planar faced rings according to the FIGS. 8 and 9 forms.

The aforesaid bevel angle is the same or substantially the same as the bevel angle of known beveled retaining rings (15° maximum) which is the safety angle designed to protect the ring from sliding or being squeezed out of its groove under axial loads. However, because of their capability of deflecting to a greater degree (50% or more), beveled-edge multi-truss rings of the invention will have a correspondingly increased take-up capability (50% or more).

Referring to FIG. 8C, such rather than being beveled along its groove seating edge as in FIG. 8A, is instead illustrative of a modified ring construction designed to compensate for axial play between the artificial shoulder provided by the assembled ring and the machine part or parts to be retained thereby, sometimes present in retaining ring asemblies due to production tolerances in the groove, in the machine part(s) and sometimes in the ring itself. More particularly, according to 8C, the shoulder forming portions of the trusses which extend from the groove are bent out of the plane of the groove-seating portions of the ring body in the direction of the machine part(s) to be retained. Such ring is assembled in the groove of a shaft (external type) or in a housing bore groove (internal type) as with the previously described rings of the invention, whereupon the angularly-bent truss portions which define the retaining shoulder will exert a substantial elastic force on the machine part (s) which it locates and/or retains.

Numerous advantages as well as economies are possible through proper use of retaining rings constructed according to the present invention. To briefly summarize these advantages, rings of the invention have substantially increased deflectability, i.e. ability to be expanded (external rings) or contracted (internal rings) without taking on a permanent set, as compared to conventional tapered retaining rings. Such enables rings of the invention to be assembled in deeper shaft- and housing-bore grooves than was heretofore thought possible and to provide a substantially higher than conventional parts-retaining shoulder, the substantial length of the truss arms interposed between and in connecting relation between the outer-edge and the inner-edge arcuate "beams" of the trusses which make up the ring body providing the substantial increase in the effective shoulder heights of the ring and also adding to the capability of the ring body to deflect (bend) in manner as to increase its diameter.

Analysis of the ring designs of the inventions and a comparison thereof with the "Prior Art" rings illustrated in FIGS. 10A & 10B as per drawing sheet herewith shows also that as the result of the aforesaid interpostioning of truss arms of appreciable length such as disposes the inner edges of the outer beams radially outwardly by a small amount from the outer edges of the inner beams, a very surprising increase or decrease in the circumferential length of the ring body will occur under the action of those same forces which are conventionally applied to expand or contract the ring in its assembly or disassembly. It is explained at this point of the discussion that such a ring-body response is not only different from but was earlier unknown to workers in the retaining ring art, wherein the only known ring-body response to ring expanding or contracting forces was ring-diameter change, as distinguished from circumferential-length change.

And when the aforesaid truss principle is applied to beveled-edge rings, end play take-up as much as 100% greater than that achieved in the use of conventional beveled-edge tapered rings is possible.

Yet a further advantage stems from rings of the tapered truss design of the invention. More particularly, with the capability of the internal rings of the invention of contracting to an outer-edge diameter substantially less than heretofore without taking on a permanent set, it becomes feasible to contract such a ring to an outer diameter appreciably less than that of the bore of a housing having the groove in which the ring is to be assembled. Should the bore wall be of a soft material, it is possible to insert a hard-metal sleeve in the bore between the bore wall and the contracted ring during the installation of the latter, said sleeve protecting the bore wall from being scored as often previously occurred when installing conventional tapered retaining rings of the internal form.

Such a hard-metal sleeve may be used independently of or it may be formed as an extension on known manual or automatic internal-ring compressing tools which function to contract rings by forcing same through a tapered orifice, in which case the hard-metal sleeve receives the contracted ring as it leaves the tool, thereupon protecting the bore wall from being scored or otherwise damaged during ring movement to the plane of the groove.

The same principle but inversely applied may be used to protect the outer cylindrical surfaces of shafts, pins and the like from damage by scoring, etc. during assembly of the external-form rings in outwardly opening grooves, the hard-metal sleeve slipped over the shaft end protecting the shaft surface to the same degree as the hard-metal sleeve inserted in the housing bore.

And as above forecast, by providing a ring which in addition to having increased bending or deflection capabilities is also so structured as to possess the capability of circumferential-length change, substantial economies in industry are attainable, in that, the invention for the first time makes possible the accommodation of a whole range of shaft or housing-bore sizes with substantially fewer sizes of retaining rings maintained in stock.

Having disclosed our invention

What is claimed is:

1. A multi-truss open-ended retaining ring adapted for assembly in a circumferential groove provided for its reception in the surface of a carrier member thereupon to form an artificial machine-part retaining shoulder projecting from said surface, the outer and inner edges of said ring body each comprising and being defined by the outer and inner edges respectively of a plurality of circumferentially spaced, non-radially related arcuate beams and said beams being connected by arms which extend divergently therebetween and provide the ring body with configuration in plan corresponding to that of a plurality of serially connected upright and inverted queen trusses, said beams having section height and said divergent connecting arms having lengths such that said arms dispose the inner-edges of said outer-edge defining arcuate beams and the outer edges of the inner-edge defining arcuate beams on arcs of circles which are spaced radially outwardly a small distance from one another, the construction and arrangement being such that circumferential stresses acting around the ring body will cause an elastic lengthening or contraction of the ring body to a significant, useful degree.

2. A multi-truss retaining ring adapted for assembly in a circumferential groove provided for its reception in the surface of a carrier member according to claim 1, wherein the beams of the queen trusses have section heights which decrease progressively from the vertical center line of the ring body to near its open ends, whereby the ring when assembled provides a tapering shoulder.

3. A multi-truss retaining ring adapted for assembly in a circumferential groove provided for its reception in the surface of a carrier member according to claim 2, wherein the ring body terminates in ends which are widely spaced apart an amount as enables radial assembly of the ring in its groove, and said ends are formed with facing open hook-formations, the open hooks providing for the reception of the points of a pliers-type tool for spreading the ring when axial assembly is desired.

4. A multi-truss retaining ring adapted for assembly in a circumferential groove provided for its reception in the surface of a carrier member according to claim 1, wherein the beams of the queen trusses have section heights which decrease progressively from the vertical center line of the ring body to near its open ends and wherein the intermediate length portions of said divergent connecting arms have progressively increasing lengths which are such that when assembled the ring provides a uniform-height shoulder.

5. A multi-truss retaining ring adapted for assembly in a circumferential groove provided for its reception in the surface of a carrier member according to claim 4 wherein the ring body terminates in ends which are widely spaced apart an amount as enables radial assembly of the ring in its groove, and said ends are formed with facing open hook-formations, the open hooks providing for the reception of the points of a pliers-type tool for spreading the ring when axial assembly is desired.

6. A multi-truss retaining ring according to claim 5, wherein the parts retaining shoulder portions of the trusses are bent out of the plane of the groove-seating portions of the ring body by a small angle and in the direction of the machine part(s) which they retain, thereby exerting a force on the retained part(s) as compensates elastically for tolerances causing axial play in the assembly.

7. A multi-truss retaining ring according to claim 4, wherein the parts retaining shoulder portions of the trusses are bent out of the plane of the groove-seating portions of the ring body by a small angle and in the direction of the machine part(s) which they retain, thereby exerting a force on the retained part(s) as compensates elastically for tolerances causing axial play in the assembly.

8. A multi-truss retaining ring according to claim 1, wherein said ring body may be comprised of from 3 to 15 so-connected trusses.

9. A multi-truss retaining ring according to claim 1, wherein the ring is fashioned as an external ring adapted to seat along its effective inner edge in an outwardly opening shaft groove.

10. A multi-truss retaining ring according to claim 9, wherein the ring is provided along its effective inner groove-seating edge with a bevel enabling the ring to take up end-play when so assembled.

11. A multi-truss retaining ring according to claim 1, wherein the ring is fashioned as an internal ring adapted to seat along its effective outer edge in an inwardly opening groove provided in a housing bore surface.

12. A multi-truss retaining ring according to claim 11 wherein the ring is provided along its outer groove-seating edge with a bevel enabling the ring to take up end-play when assembled in said housing-bore groove.

13. A multi-truss retaining ring according to claim 1, wherein the parts retaining shoulder portions of the trusses are bent out of the plane of the groove-seating portions of the ring body by a small angle and in the direction of the machine part(s) which they retain, thereby exerting a force on the retained part(s) as compensates elastically for tolerances causing axial play in the assembly.

14. A multi-truss retaining ring adapted to be assembled in a circumferential groove provided therefor in the surface of a carrier member such as that of a shaft or housing bore, thereupon to form an artificial parts-retaining shoulder, said ring being fashioned as an ope-nended ring body comprising a plurality of serially-connected upright queen and inverted queen trusses having common connecting arms extending divergently from and connecting the "beams" of said trusses in series with one another, the "beams" of said queen trusses having section heights which decrease progressively from the vertical center line of the ring body to near its open ends, and the connecting arms each having length at least substantially equal to the length of its neutral axis as measured between points of intersection of said axis with the outer edge of the outer arcuate "beam" and the inner edge of the adjoining inner arcuate "beam" and angular disposition with respect to "beams" which they connect which may vary from 7° – 20°, the construction and arrangement being such that forces applied to the ring body to expand or contract same also act through the "beams" connected by each said arm to produce bending moments effective on said arms causing an appreciable rotation thereof in direction as to increase or decrease the circumferential length of said trusses and thereby of the ring body.

15. A multi-truss retaining ring according to claim 14, wherein said neutral axis of the divergent truss arm connecting the arcuate "beam" opposite or nearly opposite the opening between the ring ends has length at least twice the section height of the arcuate truss "beam".

16. A multi-truss retaining ring according to claim 15, wherein the section height of said opposite or nearly opposite "beam" may vary from ring-material thickness to 3½ ring-material thickness.

17. A multi-truss retaining ring according to claim 14 wherein the angular disposition of any one of the connecting arms with respect to the outer arcuate "beams" which it connects corresponds substantially with the angle of inclination of said truss-arm neutral axis with respect to a radius from the ring center to a mid-length point of said outer arcuate "beam".

18. A multi-truss retaining ring according to claim 14, wherein the ring is fashioned as an external ring adapted to seat along its effective inner edge in an outwardly opening shaft groove.

19. A multi-truss retaining ring according to claim 18 wherein the ring is provided along its effective inner groove-seating edge with a bevel enabling the ring to take up end-play when assembled.

20. A multi-truss retaining ring according to claim 14 wherein the ring is fashioned as an internal ring adapted to seat along its effective outer-edge in an inwardly opening groove provided in a housing-bore surface.

21. A multi-truss retaining ring according to claim 20 wherein the ring is provided along its effective outer groove-seating edge with a bevel enabling the ring to take up end-play when assembled.

22. A multi-truss retaining ring according to claim 14, wherein the ring body comprises 3 to 15 such connected trusses.

23. A multi-truss retaining ring according to claim 14, wherein the ring body terminates in ends which are widely spaced apart as enables the ring to be assembled radially as well as axially.

* * * * *